(12) United States Patent
Yang et al.

(10) Patent No.: US 6,470,720 B1
(45) Date of Patent: Oct. 29, 2002

(54) STEERING WHEEL LOCK

(76) Inventors: Cheng-Feng Yang, No. 245, Dong Huan Rd., Hsi Hu Chen, Changhwa Hsien (TW); Mu-Kuei Yang, No. 245, Dong Huan Rd., Hsi Hu Chen, Changhwa Hsien (TW); Sheng-Chun Yang, No. 245, Dong Huan Rd., Hsi Hu Chen, Changhwa Hsien (TW)

( * ) Notice: Subject to any disclaimer, the term of this patent is extended or adjusted under 35 U.S.C. 154(b) by 0 days.

(21) Appl. No.: 09/984,917

(22) Filed: Oct. 31, 2001

(51) Int. Cl.⁷ .............................................. B60R 25/02
(52) U.S. Cl. ............................................ 70/209; 70/56
(58) Field of Search ..................... 70/209, 226, 212, 70/54–56, DIG. 43, DIG. 56

(56) References Cited

U.S. PATENT DOCUMENTS 4,873,849 A * 10/1989 Goodson et al. ............... 70/54
5,491,990 A * 2/1996 Von-Lambert ............... 70/209
5,765,414 A * 6/1998 Yu ............................... 70/209
5,842,361 A * 12/1998 Banez .......................... 70/209
5,868,016 A * 2/1999 Duran, Sr. .................... 70/209
5,992,190 A * 11/1999 Townsend .................... 70/209

* cited by examiner

Primary Examiner—Lloyd A. Gall
(74) Attorney, Agent, or Firm—Varndell & Varndell, PLLC

(57) ABSTRACT

A steering wheel lock includes two shells, a male coupling member and a female coupling member respectively fixedly provided at the shells and coupled to each other for enabling the shells to be moved relatively to each other and closely attached to the top side of the steering wheel, and two locking units respectively disposed inside the shells and controlled to lock the shells, each locking unit including a lock body fixedly provided inside one shell, and a shackle inserted through two through holes on a peripheral stop flange of the corresponding shell into respective shackle holes of the respective lock body over the bottom side of the steering wheel and locked by spring latches of the respective lock body.

5 Claims, 10 Drawing Sheets

STEERING WHEEL LOCK

BACKGROUND AND SUMMARY OF THE INVENTION

The present invention relates to a steering wheel lock and, more particularly, to such a steering wheel lock, which is easy to use and, effectively prevents the insertion of a pry.

A variety of steering wheel locks have been disclosed for use to lock the steering wheel of a motor vehicle, and have appeared on the market. FIG. 1 shows a steering wheel lock according to the prior art. This structure of steering wheel lock comprises a shell fitting over the steering wheel, a tubular casing detachably hooked on the shell a rod member slidably inserted into the tubular casing and detachably hooked on the shell, and a lock cylinder provided in the tubular casing and adapted to lock the rod member in the cylindrical casing. This structure of steering wheel lock is inconvenient in use because the shell, the rod member and the tubular casing are not coupled together before use. Further because the hook of the tubular casing and the hook of the rod member are exposed to the outside after locking of the steering wheel lock, a thief can easily damage the hook of the tubular casing and the hook of the rod member with a spry. FIG. 2 shows another structure of steering wheel lock according to the prior art. This structure of steering wheel lock is similar to the design shown in FIG. 1 with the exception of the adjustable arrangement of the shell. The shell has a sliding plate coupled thereto to fit different steering wheels. This design has the same drawbacks of the design shown in FIG. 1. Further, during the installation of the rod member, the hook of the rod member must be selectively hooked in matching holes on the shell and the sliding plate. FIG. 3 shows still another structure of steering wheel lock according to the prior art. This structure of steering wheel lock comprises two shells coupled together by a slip joint. Because the shells are overlapped on each other, a pry can easily be inserted in between the shells and bent to destroy the slip joint.

The present invention has been accomplished to provide a steering wheel lock, which eliminates the aforesaid drawbacks. It is one object of the present invention to provide a steering wheel lock, which prohibits the insertion of a pry. It is another object of the present invention to provide a steering wheel lock, which is easy to use. According to one aspect of the present invention, the steering wheel lock comprises two shells, a male coupling member, for example, an U-shaped tube and a female coupling member, for example, an U-bar respectively fixedly provided at the shells and coupled to each other for enabling the shells to be moved relatively to each other and closely attached to the top side of the steering wheel, and two locking units respectively disposed inside the shells and controlled to lock the shells. According to another aspect of the present invention, each locking unit comprises a lock body fixedly provided inside one shell, and a shackle inserted through two through holes on a peripheral stop flange of the corresponding shell into respective shackle holes of the respective lock body over the bottom side of the steering wheel and locked by spring latches of the respective lock body. According to still another aspect of the present invention, each shell comprises a smoothly arched positioning groove adapted to receive the smoothly arched middle section of the shackle of the corresponding locking unit, preventing the insertion of a pry into the gap between the shackle and the corresponding shell after locking of the steering wheel lock.

DETAILED DESCRIPTION OF THE PREFERRED EMBODIMENT

Figure 1:
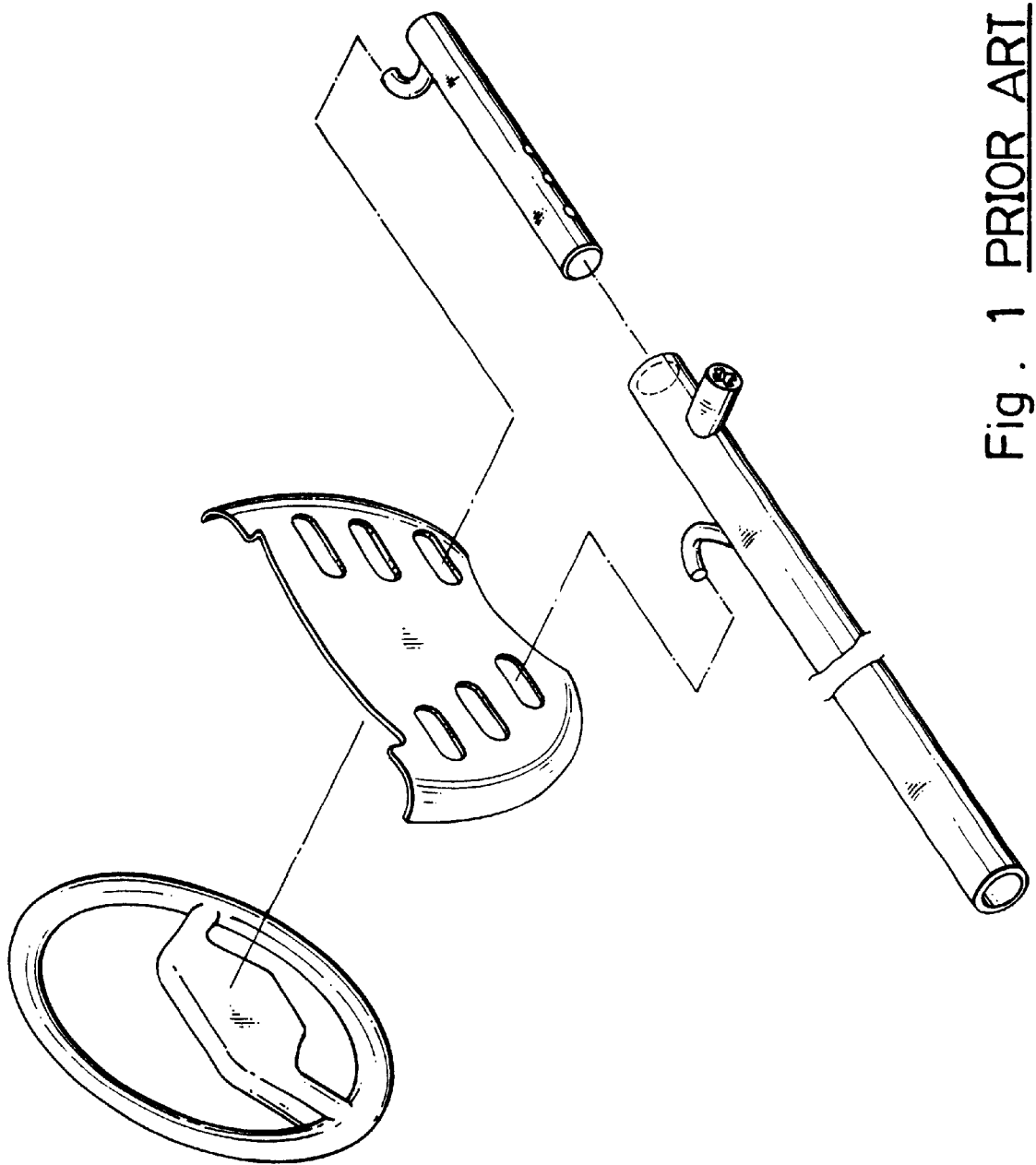
FIG. 1 is an exploded view of a steering wheel lock according to the prior art.
Figure 2:
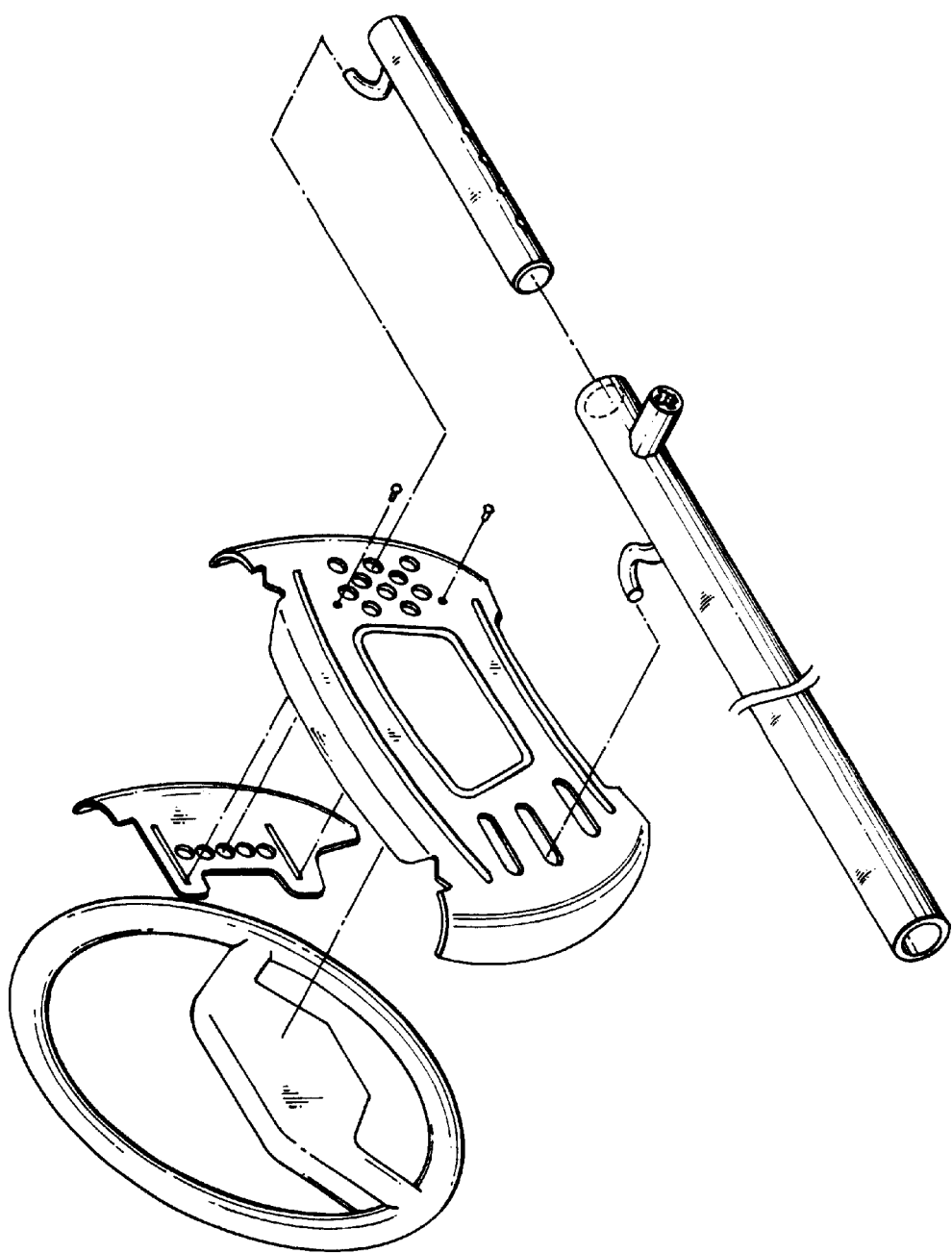
FIG. 2 is an exploded view of another structure of steering wheel lock according to the prior art.
Figure 3:
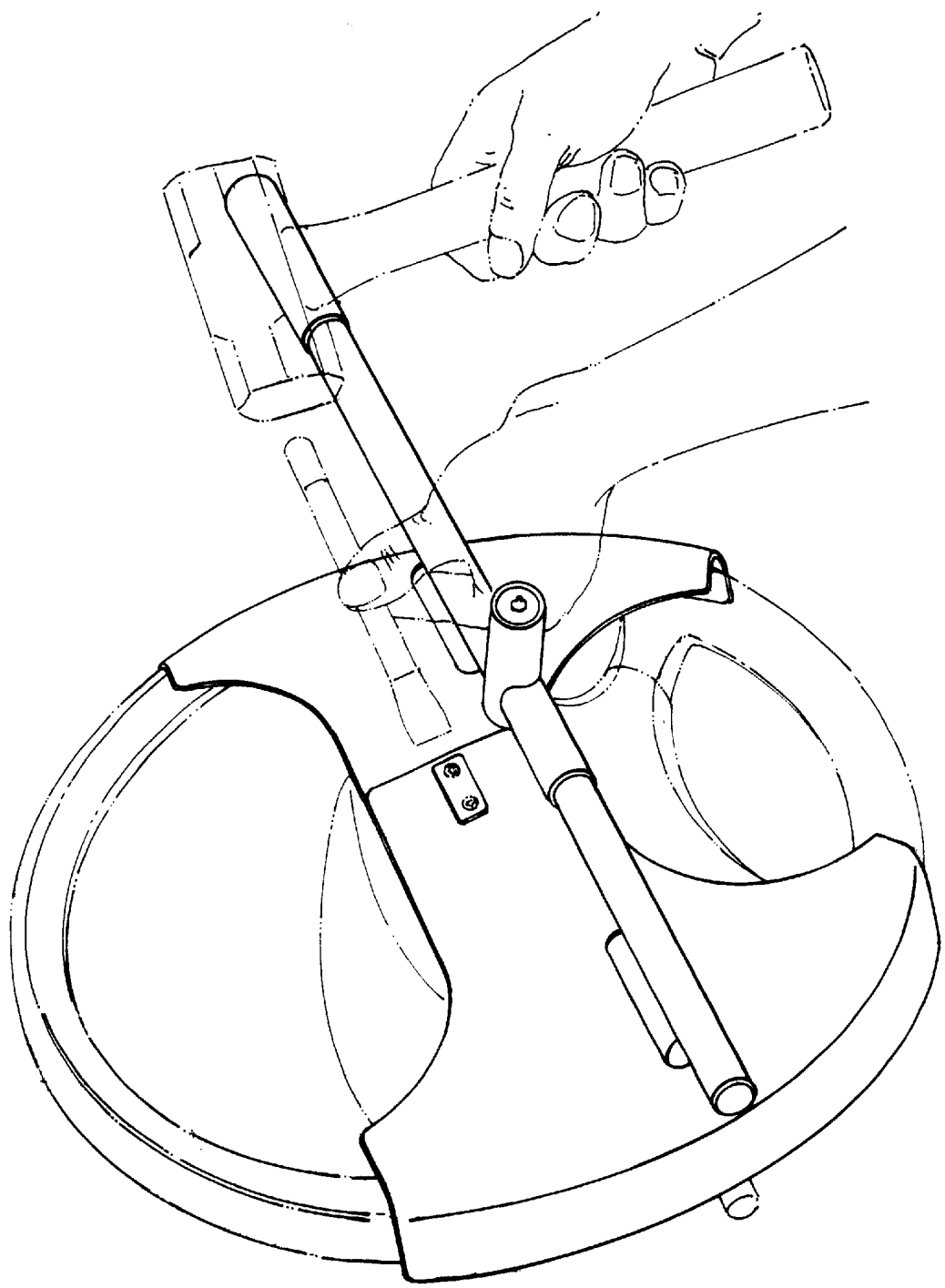
FIG. 3 shows still another structure of steering wheel lock according to the prior art.
Figure 4:
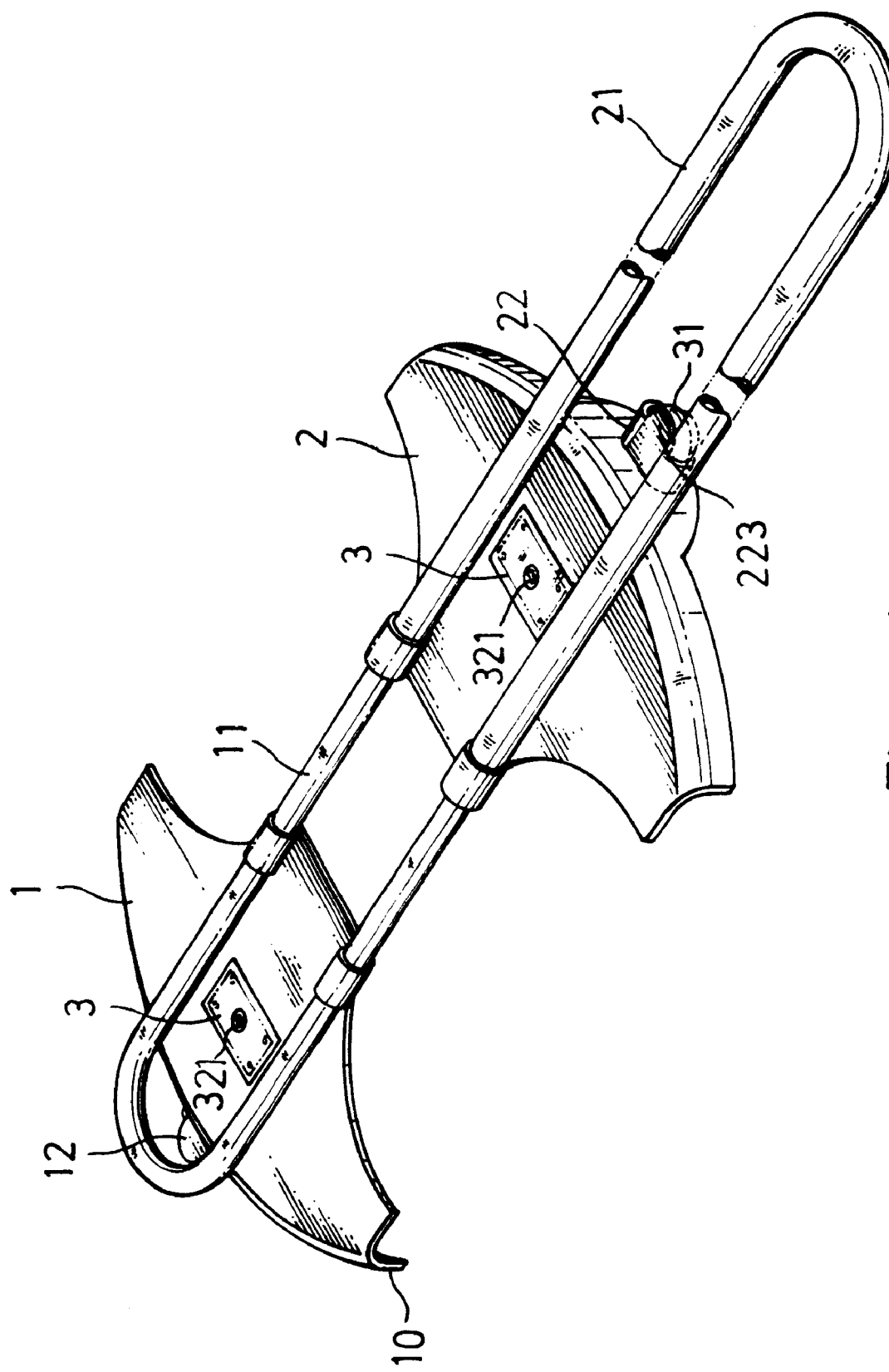
FIG. 4 is a perspective assembly view of a steering wheel lock according to the present invention.
Figure 5:
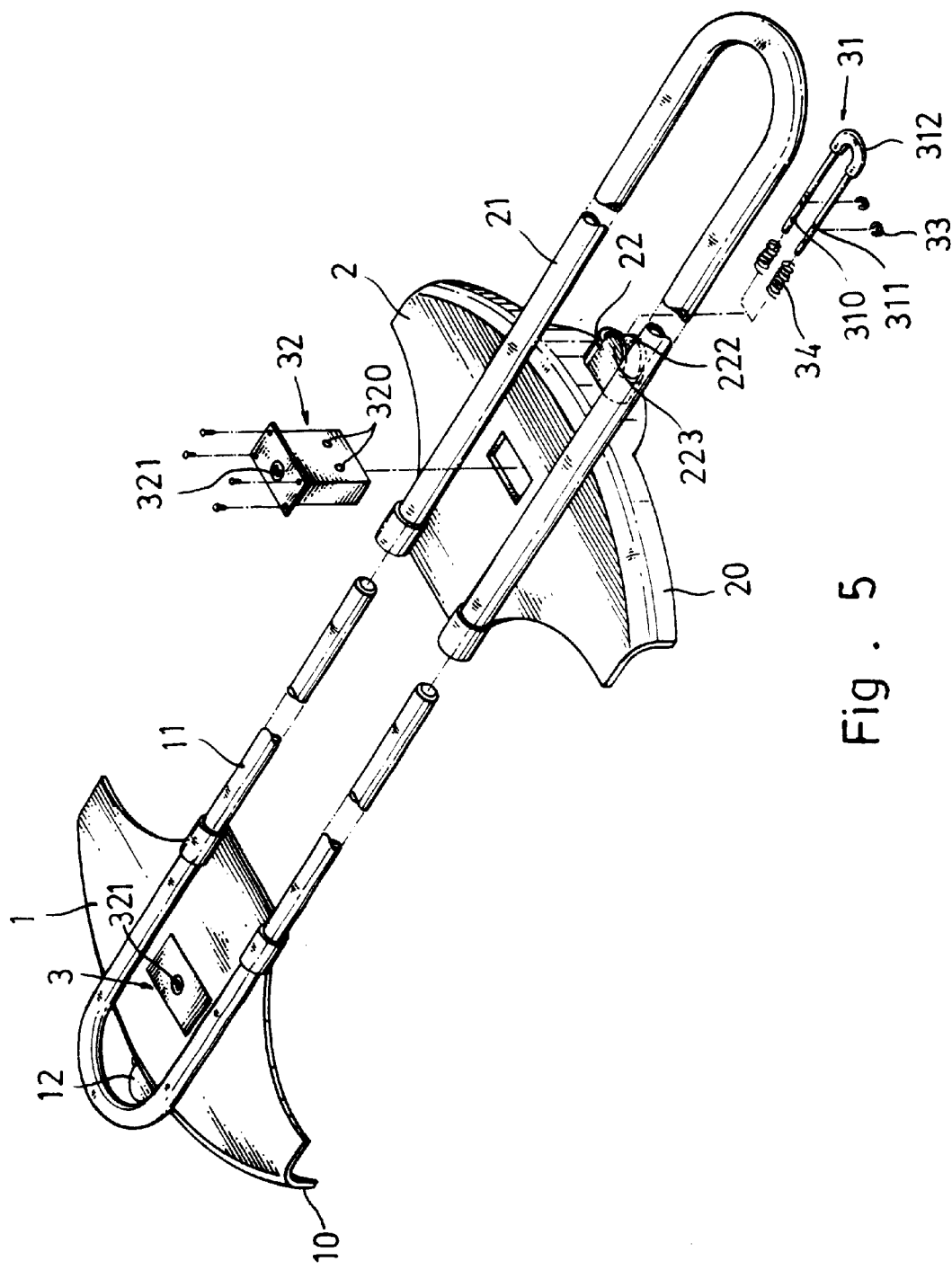
FIG. 5 is an exploded view of the steering wheel lock shown in FIG. 4.
Figure 6:
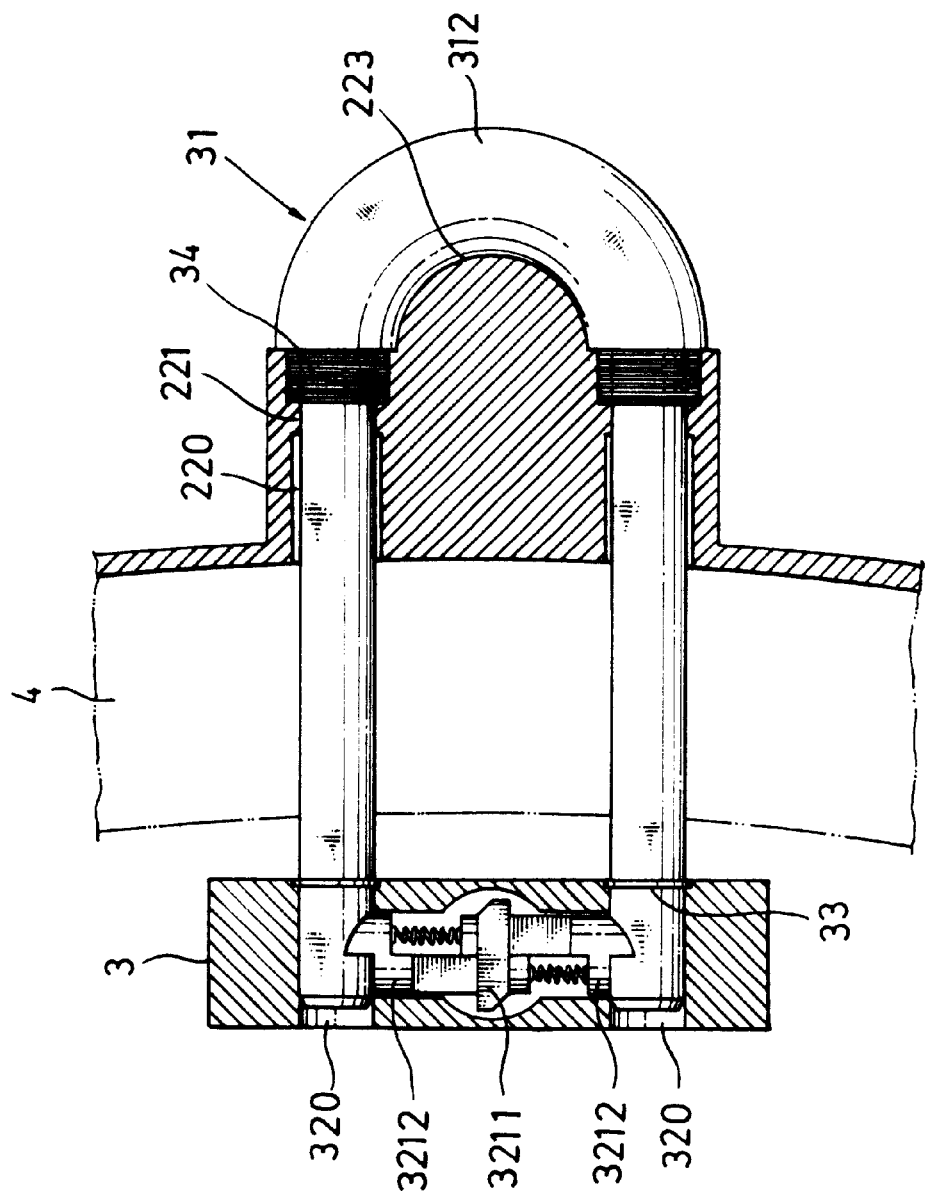
FIG. 6 is a sectional view in an enlarged scale of a part of the present invention, showing the locking unit locked.
Figure 7:
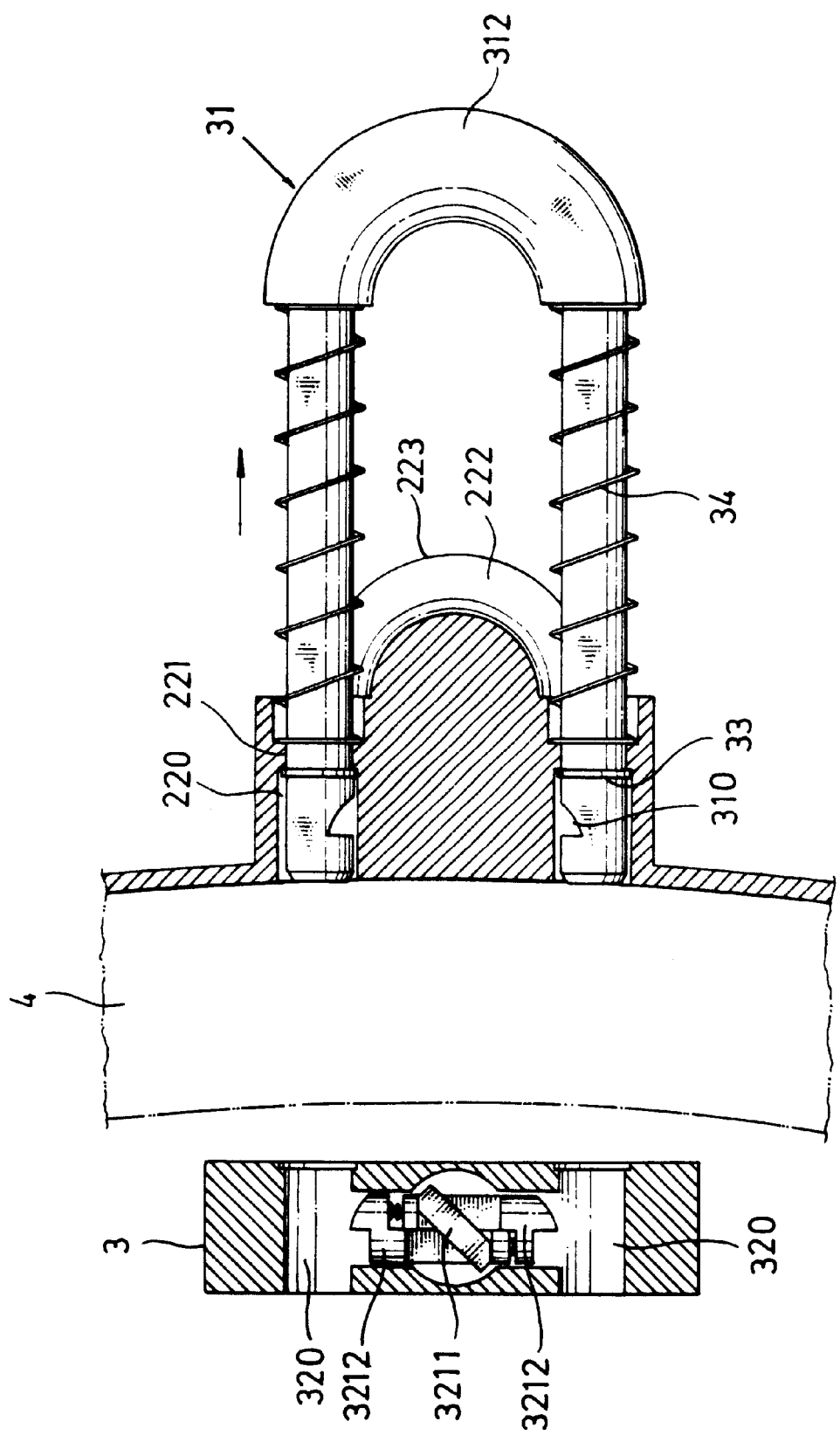
FIG. 7 a sectional view in an enlarged scale of a part of the present invention, showing the locking unit unlocked.

Referring to FIGS. 4 and 5, a steering wheel lock in accordance with the present invention is adapted to lock the steering wheel of a motor vehicle. The steering wheel lock comprises two symmetrical shells 1 and 2 respectively fitting over the periphery of the steering wheel, the shells 1 and 2 each having a smoothly arched, downwardly extended peripheral stop flange 10;20 a female coupling member, for example, an U-shaped tube 21 fixedly mounted on the top sidewall of one shell 2, a male coupling member, for example, a U-bar 11 fixedly mounted on the top sidewall of the other shell 1 and slidably inserted into the U-shaped tube 21, and two locking units 3 respectively installed in the shells 1 and 2.

Referring to FIGS. from 6 through 8 and FIGS. 4 and 5 again, the shells 1 and 2 are respectively attached to the top side of the steering wheel 4 with the respective peripheral stop flanges 10 and 20 respectively stopped at the periphery of the steering wheel 4 at two sides, and then the locking units 3 are fastened up to lock the steering wheel lock. The shells 1 and 2 each comprise a locating block 12 or 22 integral with the respective peripheral stop flange 10 or 20 on the middle. The locating block 12 or 22 comprises two parallel through holes 220, two inside annular flanges 221 respectively disposed in the through holes 220, a smoothly arched protruding portion 223 disposed between the through holes 220, and a smoothly arched positioning groove 222 extended through the protruding portion 223 between the through holes 220. Each locking unit 3 comprises a shackle 31, a lock body 32, two C-shaped clamps 33, and two coil springs 34. The shackle 31 is an U-shaped locking bar inserted through the through holes 220 of the locating block 12 or 22 of the shell 1 or 2, comprising a smoothed arched middle section 312 fitting the smoothly arched positioning groove 222 of the locating block 12 or 22, two retaining notches 310 respectively disposed near the two distal ends thereof, and two necks 311; respectively disposed adjacent to the retaining notches 310. The C-shaped clamps 33 are respectively clamped on the necks 311 after the insertion of the two distal ends of the shackle 31 into the through holes 220 of the locating block 12 or 22. When pulling the shackle 31 backwards, the C-shaped clamps 33 are stopped against the inside annular flanges 221 of the locating block 12 or 22 to prevent the shackle 31 from falling out of the locating block 12 or 22. The lock body 32 is fixedly mounted inside the shell 1 or 2, comprising two parallel shackle holes 320 respectively aimed at the through holes 220 of the locating block 12 or 22 and adapted to receive the corresponding shackle 31, and a lock cylinder 321. The lock cylinder 321 comprises an actuating block 3211, and two spring latches 3212 respectively linked to the actuating block 3211 and respectively perpendicularly aimed at the shackle holes 320 and driven by the actuating block 3211 to move in and out of the shackle holes 320.

Figure 8:
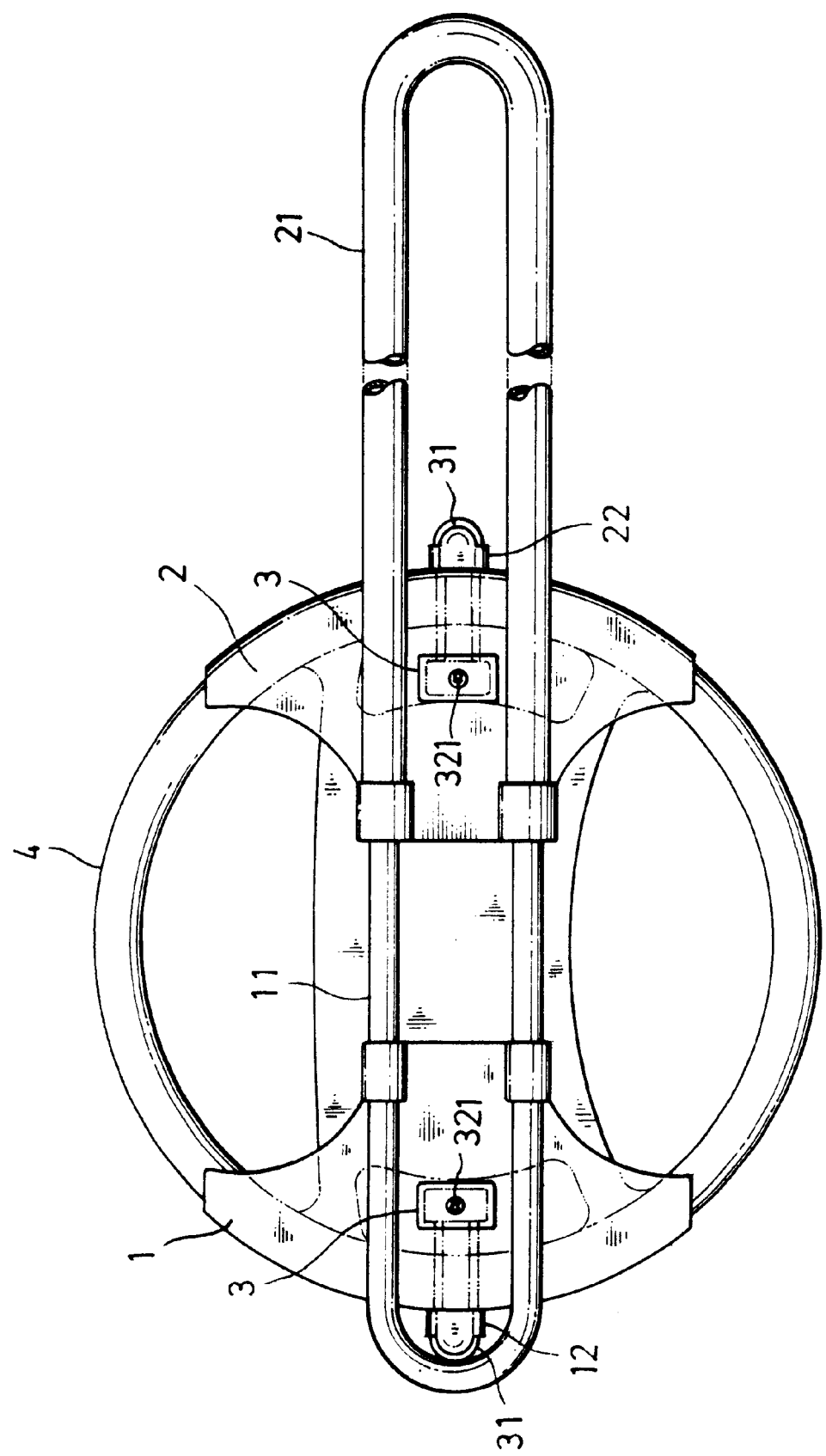
FIG. 8 is a top view showing the steering wheel lock installed in the steering wheel and locked.
Figure 9:
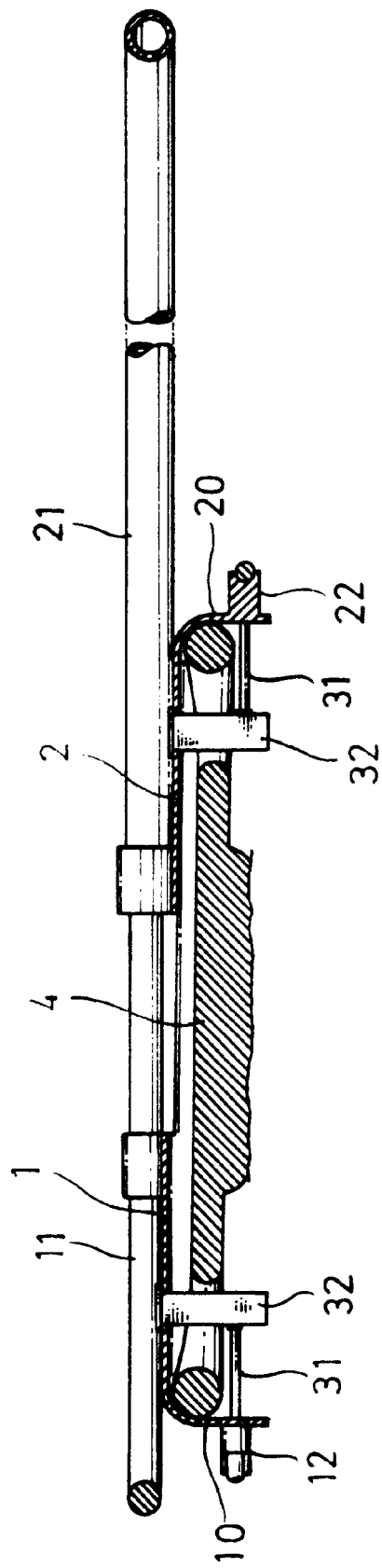
FIG. 9 is a side view partially in section of FIG. 8.

Referring to FIG. 9 and FIG. 8 again, the shells 1 and 2 are respectively attached to the top side of the steering wheel 4, and then the U-bar 11 and the U-shaped tube 21 are moved toward each other to force the respective stop flanges 10 and 20 against the periphery of the steering wheel 4, and then the shackle 31 of each locking unit 3 is respectively inserted into the shackle holes 320 of the respective lock body 32 to force the respective retaining notches 310 into engagement with the respective spring latches 3212. When locked, the smoothly arched middle section 312 of the shackle 31 of each locking unit 3 is positioned in the smoothed arched groove 222 of the corresponding locating block 12 or 22, and prohibited from being pulled outwards with a pry by the thief. When turning the lock cylinder 321 of the lock body 32 of each locking unit 3 with the key to pull the respective spring latch 3212 backwards from the respective shackle holes 320, the shackle 31 is unlocked and the respective coil springs 34 automatically push the respective shackle 31 outwards from the corresponding locating block 12 or 22.

Figure 10:
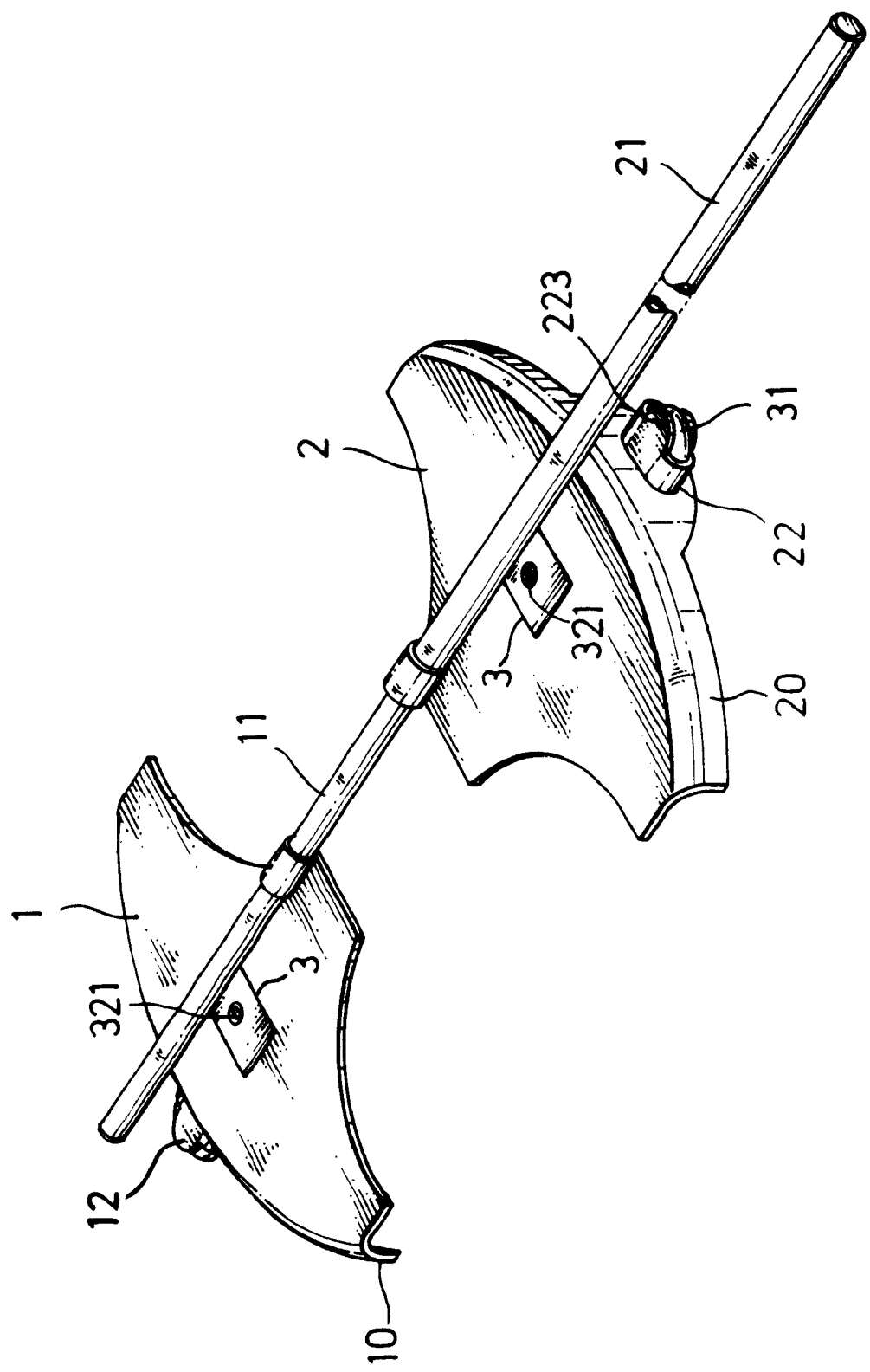
FIG. 10 illustrates an alternate form of the steering wheel lock according to the present invention.

FIG. 10 shows an alternate form of the present invention. According to this alternate form, the male coupling member 11 is a straight rod, and the female coupling member 21 is a straight tube adapted to receive the straight rod 11.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A steering wheel lock comprising:
    a first shell and a second shell to be attached to the top side of the steering wheel to be locked, said first shell and said second shell each comprising a peripheral stop flange adapted to stop against the periphery of the steering wheel, and a locating block integral with said peripheral stop flange, said locating block comprising two parallel through holes;
    female coupling means fixedly mounted on said first shell;
    male coupling means fixedly mounted on said second shell and coupled to said female coupling means for enabling said first shell and said second shell to be moved relative to each other; and
    two locking units respectively installed in said first shell and said second shell and adapted to lock said first shell and said second shell in the steering wheel, said locking units each comprising a lock body fixedly mounted in one of said first shell and said second shell, and a shackle inserted through the through holes of the locating block of one of said first shell and said second shell over the bottom side of the steering wheel and secured to the lock body of the respective locking unit.

2. The steering wheel lock of claim 1 wherein the shackle of each of said locking units comprises two necks respectively disposed near two distal ends thereof and two C-shaped clamps respectively clamped on said necks; the locking block of each of said shells comprises an inside annular flange disposed inside each of the two through holes thereof and adapted to stop the C-shaped clamps of the shackle of each of said locking units respectively, preventing the shackle of each of said locking units from falling out of the locating block of each of said first shell and said second shell.

3. The steering wheel lock of claim 2 wherein said locking units each further comprise two spring members respectively mounted on the respective shackle and respectively stopped against the inside annular flanges of the locating block of each of said first shell and said second shell to impart an outward pressure to the respective shackle.

4. The steering wheel lock of claim 1 wherein the locating block of each of said first shell and said second shell comprises a smoothly arched protruding portion, and a smoothly arched positioning groove extended through said smoothly arched protruding portion and adapted to receive a smoothly arched middle part of the shackle of each of said locking units respectively.

5. The steering wheel lock of claim 1 wherein the shackle of each of said locking units comprises two retaining notches respectively disposed near two distal ends thereof; the lock body of each of said locking units comprises two parallel shackle holes respectively aimed at the through holes of the locating block of each of said first shell and said second shell and adapted to receive the respective shackle, and a lock cylinder, said lock cylinder comprising an actuating block for turning with a key, and two spring latches respectively linked to said actuating block and adapted to engage the retaining notches of the respective shackle.

\* \* \* \* \*